U S006211299B1

US006211299B1

(12) United States Patent
Moss, III et al.

(10) Patent No.: US 6,211,299 B1
(45) Date of Patent: Apr. 3, 2001

(54) IN SITU SOLVENT FREE METHOD FOR MAKING ANHYDRIDE BASED GRAFT COPOLYMERS

(75) Inventors: Thomas H. Moss, III, Rome, GA (US); Klein A. Rodrigues, Signal Mountain, TN (US)

(73) Assignee: National Starch and Chemical Investment Holding Corporation, Wilmington, DE (US)

( * ) Notice: Subject to any disclaimer, the term of this patent is extended or adjusted under 35 U.S.C. 154(b) by 0 days.

(21) Appl. No.: 09/368,512

(22) Filed: Aug. 5, 1999

Related U.S. Application Data

(62) Division of application No. 09/047,032, filed on Mar. 24, 1998, now abandoned.

(51) Int. Cl.[7] .................. C08F 267/04; C08F 120/66; D06M 15/00
(52) U.S. Cl. .................. 525/285; 525/384; 525/327.4; 525/207; 525/404; 252/8.62; 510/529
(58) Field of Search ................ 525/384, 327.4, 525/285, 207, 404; 252/8.62; 510/529

(56) References Cited

U.S. PATENT DOCUMENTS

| 3,485,762 | 12/1969 | Gower et al. | 252/152 |
|---|---|---|---|
| 5,158,996 | 10/1992 | Valenti | 524/5 |
| 5,612,396 | * 3/1997 | Valenti et al. | 525/5 |
| 5,658,993 | * 8/1997 | Denzinger et al. | 525/285 |

* cited by examiner

Primary Examiner—James J. Seidleck
Assistant Examiner—Olga Asinovsky
(74) Attorney, Agent, or Firm—Thomas F. Roland, Esq.

(57) ABSTRACT

In situ solvent free methods for making anhydride based graft copolymers which involve mixing an ethylenically unsaturated monomer, an anhydride monomer, either a monofunctional polyglycol having a hydroxyl or amine terminal group or a polyfunctional polyglycol having a weight average molecular weight of greater than 5,000 and at least one terminal hydroxyl group, and a free radical initiator to form a mixture. The mixture is heated to form a copolymer having repeat units derived from the ethylenically unsaturated monomer and anhydride monomer, and a copolymer grafted polyglycol comprising a main polyglycol backbone having copolymer side chains which are heated to form an anhydride based graft copolymer. The anhydride based graft copolymers are especially useful as soil release agents in detergent formulations.

3 Claims, No Drawings

IN SITU SOLVENT FREE METHOD FOR MAKING ANHYDRIDE BASED GRAFT COPOLYMERS

CROSS-REFERENCE TO RELATED APPLICATIONS

This is a divisional of U.S. patent application Ser. No. 09/047,032, filed Mar. 24, 1998 now abandoned.

FIELD OF THE INVENTION

This invention relates to an in situ solvent free method for making anhydride based graft copolymers. The graft copolymers are especially useful as soil release agents in detergent and textile applications.

BACKGROUND OF THE INVENTION

Styrene-maleic anhydride copolymers are typically made by solution polymerization in the presence of aromatic hydrocarbon solvents or ketone solvents. In addition to the solvents being environmentally undesirable, recovering the styrene-maleic anhydride copolymers from the solvent requires additional process steps. For example, aromatic solvents used in the solution polymerization generally require a decanting and drying step prior to recovering the copolymer product, and ketone solvents generally require a solvent-stripping step prior to recovering the copolymer product.

U.S. Pat. No. 3,485,762 describes a process for preparing styrene-maleic anhydride copolymers which are used in a detergent formulation containing polyethylene glycol. The styrene-maleic anhydride copolymers are prepared by solution polymerization using incremental feed addition of the styrene and maleic anhydride monomers and catalyst into a reactor containing an aromatic solvent. The polymerization is conducted at the reflux temperature of the monomers and solvent mixture. The copolymer is isolated and mixed with polyethylene glycol in a detergent formulation. The styrene-maleic anhydride copolymers are present as a physical mixture with the polyethylene glycol and as a partial ester of the polyethylene glyol and styrene-maleic anhydride copolymer.

U.S. Pat. No. 5,158,996 describes a process for preparing styrene-maleic anhydride graft copolymers by solution polymerization in a ketone solvent. The copolymer is isolated and reacted with polyethylene glycol to form a copolymer product containing a styrene-maleic anhydride main backbone chain having polyethylene glycol side chains.

SUMMARY OF THE INVENTION

Accordingly, it is an object of the invention to provide a method for making anhydride based graft copolymers.

It is another object of the invention to provide an environmentally safe and economical method for making anhydride based graft copolymers.

It is also an object of the invention to provide an in situ method for making anhydride based graft copolymers.

It is an additional object of the invention to provide a polymer which improves the cleaning properties of cleaning compositions by removing soil.

It is another object of the invention to provide a polymer which imparts soil resistance to an article.

With regard to the foregoing and other objects, the present invention provides an in situ solvent free method for making an anhydride based graft copolymer, said method comprising (I) mixing from about 50 to about 90 mole percent, based on the total moles of monomer, of an ethylenically unsaturated monomer, from about 10 to about 50 mole percent, based on the total moles of monomer, of an anhydride monomer selected from the group consisting of maleic anhydride, itaconic anhydride, and mixtures thereof, either a monofunctional polyglycol having a hydroxyl or amine terminal group or a polyfunctional polyglycol having a weight average molecular weight of greater than 5,000 and at least one terminal hydroxyl group, and a free radical initiator to form a mixture;

(II) heating the mixture at a temperature of from about 30° C. to about 150° C. for a sufficient period of time to form a copolymer having repeat units derived from the ethylenically unsaturated monomer and anhydride monomer, and a copolymer grafted polyglycol comprising a main polyglycol backbone having copolymer side chains, wherein the copolymer and copolymer grafted polyglycol are dispersed in unreacted polyglycol; and (III) heating the copolymer, copolymer grafted polyglycol and unreacted polyglycol at a temperature of from about 50° C. to about 300° C. for a sufficient period of time to form an anhydride based graft copolymer, wherein the anhydride based graft copolymer is selected from the group consisting of a polyglycol grafted copolymer comprising a main copolymer backbone chain having polyglycol side chains, a copolymer grafted polyglycol comprising a main polyglycol backbone having copolymer side chains, a polyglycol and copolymer grafted copolymer comprising a main copolymer backbone chain having polyglycol side chains and copolymer side chains attached to the polyglycol side chains, and mixtures thereof.

According to another aspect the invention provides a method of cleaning which involves preparing a cleaning composition comprising the anhydride based graft copolymer, contacting the cleaning solution with one or more articles, wherein at least one of the articles contains soil, and removing at least a portion of the soil from the article containing soil.

According to a further aspect the invention provides a method of imparting soil resistance to an article which involves preparing a cleaning composition comprising the anhydride based graft copolymer, and contacting the cleaning composition with the article to provide soil resistance to the article.

The anhydride based graft copolymers when used in a cleaning process, remove soil from articles, inhibit soil deposition on articles, and provide soil resistance to articles. Examples of cleaning compositions containing the anhydride based graft copolymers are laundry detergents, prespotters, dishwashing detergents, and hard surface cleaners. The anhydride based graft copolymers are sufficiently hydrophobic to absorb to an article such as cloth either in a washing process, yet retain enough hydrophilic character to decrease the hydrophobic nature of an article such as polyester.

DETAILED DESCRIPTION OF THE INVENTION

The method of the invention for making the anhydride based graft copolymer involves three steps. In the first step, a mixture is prepared which contains an ethylenically unsaturated monomer, an anhydride monomer, a monofunctional polyglycol having a hydroxyl or amine terminal group, and a free radical initiator. The ethylenically unsaturated monomer is selected from vinyl esters, alpha olefins, alkyl esters of acrylic and methacrylic acid, substituted or unsubstituted mono and dialkyl esters of unsaturated dicarboxylic acids, unsaturated carboxylic acids, vinyl aromatics, unsubstituted or substituted acrylamides, cyclic monomers, sulfonated monomers, and vinyl amide monomers. A combination of ethylenically unsaturated monomers may also be used in the method of the invention.

Suitable vinyl esters are, for example, vinyl acetate, vinyl formate, vinyl propionate, vinyl butyrate, vinyl isobutyrate, vinyl valerate, vinyl 2-ethyl-hexanoate, etc. Suitable alkyl esters of acrylic and methacrylic acid are, for example, methyl acrylate, methyl methacrylate, ethyl acrylate, ethyl methacrylate, butyl acrylate, etc. Suitable substituted or unsubstituted mono and dialkyl esters of unsaturated dicarboxylic acids are, for example, substituted and unsubstituted mono and dibutyl, mono and diethyl maleate esters as well as the corresponding fumarates. Suitable unsaturated carboxylic acids are, for example, crotonic acid, acrylic acid, methacrylic acid, fumaric acid, maleic acid, itaconic acid, citraconic acid, and their alkyl esters etc.

Suitable vinyl aromatic monomers are, for example, styrene, 3-isopropenyl-α, (α-dimethylbenzyl isocyanate 1-vinyl napthalene, 2-vinyl napthalene, 3-methyl styrene, 4-propyl styrene, t-butyl styrene etc. Suitable acrylamide based monomers are, for example, acrylamide, N, N dimethylacrylamide, N-octyl acrylamide, N-methylol acrylamide, dimethylaminoethylacrylate etc. Suitable cyclic monomers are, for example, vinyl pyrrolidone, vinyl imidazolidone, vinyl pyridine etc. Suitable sulfonated monomers are, for example, 2-acrylamido-2-methyl propane sulfonic acid, sodium methallyl sufonate, sodium vinyl sulfonate, sulfonated sytrene etc. Suitable vinyl amidemonomers are, for example, N-vinyl formamide, N-vinyl acetamide, etc. Suitable α-olefin based monomers are, for example, $C_4$–$C_{20}$ based alkyl monomers such as 1-octene, butylene, 1-dodecene, etc. The ethylenically unsaturated monomer is preferably styrene.

The anhydride monomer contains ethylenically unsaturation. Combinations of anhydride monomers may also be used in the method of the invention. Preferably the anhydride monomer is selected from maleic anhydride or itaconic anhydride.

The polyglycol is preferably a monofunctional polyglycol having a terminal hydroxyl or amine group. Polyfunctional polyglycols having two or more terminal functional groups may be used in the method of the invention provided that such polyfunctional polyglycols have a weight average molecular weight of greater than 5,000 and at least one of the terminal function groups is a hydroxyl group.

Preferably, the polyglycol is a condensation product of an alkyl oxide having 2 to 20 carbon atoms, preferably 2 to 6 carbon atoms. Suitable alkyl oxides are, for example, ethylene oxide, propylene oxide, butylene oxide, hexylene oxide, etc. The polyglycol can also be an alcohol ethoxylate wherein the alcohol is a linear or branched alkyl alcohol having 1 to 20 carbon atoms. Examples of such alcohols are hexanol, dodecanol, decanol, etc. The alcohol can also be an aryl alcohol such as phenol or an alkylaryl alcohol such as nonyl phenol. Preferably the polyglycol is selected from a monofunctional polyethylene glycol having from about 6 to about 20 ethylene glycol repeating units, or a $C_1$–$C_{20}$ alcohol ethoxylate having from 6 to 10 moles of ethoxylation. Mixtures of polyglycols may also be used in the method of the invention.

In a preferred embodiment of the invention, the polyglycol has the formula $R^1$—$(CH_2CHR^3O)_m$—$R^2$ wherein $R^1$ is OH or $NH_2CHR^3CH_2$, $R^2$ is selected from an alkyl group having $C_1$–$C_4$ or phenol, m is from about 2 to about 20, and $R^3$ is independently H, methyl, ethyl, propyl, or phenyl.

In a second preferred embodiment of the invention, the polyglycol has the formula $R^1$—$(CH_2CHR^3O)_m$—$(CH_2)_n$—H wherein $R^1$ is OH or $NH_2$ $CHR^3CH_2$, m is from about 2 to about 20, and n is from about 5 to about 20. More preferably, m is from about 5 to about 10 and n is from about 12 to about 15.

The free radical initiator can be any initiator which is capable of generating free radicals. Some representative examples of free radical initiators which may be used in the method of the invention are the various persulfates, percarbonates, perborates, peroxides, azo compounds, and perketals. Specific examples of such free radical initiators are potassium persulfate, ammonium persulfate, sodium persulfate, benzoyl peroxide, hydrogen peroxide, di-t-butyl peroxide, dicumyl peroxide, caproyl peroxide, 2,4-dichlorobenzoyl perooxide, decanoyl peroxide, lauryl peroxide, cumene hydroperoxide, p-menthane hydroperoxide, t-butyl hydroperoxide, acetyl acetone peroxide, dicetyl peroxydicarbonate, t-butyl peroxyacetate, t-butyl peroxymaleic acid, t-butyl peroxybenzoate, acetyl cyclohexyl sulfonyl peroxide, 2-t-butylazo-2-cyanopropane, dimethyl azodiisobutyrate, azoduisobutyronitrile, 2-t-butylazo-1-cyanocyclohexane, 1-t-amylazo-1-cyanocyclohexane, 2,2-azobis (2,4-dimethylpentanenitrile), 2,2-azobis (2-methylpentanenitrile), 2,2-azobis (2-methylbutanenitrile), 1,1-azobis-(cyclohexanecarbonitrile), ethyl 3,3-bis(t-butylperoxy) butyrate, 1,1-di-(t-butylperoxy) cycloyhexane. Combinations of free radical initiators may also be used. Preferably the free radical initiator is a peroxide, such as dicumyl peroxide and lauryl peroxide.

The choice of free radical initiator and amount employed will depend on the reactivity of the initiator. Preferably, the free radical initiator is present in an amount of from about 0.01 to about 10 weight percent, preferably from about 0.1 to about 2 weight percent, based on the total weight of monomers in the polymerization reactor. It is noted that using too much of a very reactive initiator in the polymerization reaction may cause excessive grafting which may result in crosslinking between side chains and the formation of an insoluble gel which is undesirable.

The anhydride based graft copolymer is prepared by polymerizing the monomers and polyglycol in the presence of a free radical initiator in a polymerization reactor. The polymerization is conducted utilizing either a batch process or a continuous monomer addition or incremental monomer addition. As used herein, the term "batch" refers to a process whereby the entire amount of monomers is added in a single charge. The terms "continuous monomer addition" and "incremental monomer addition" refers to a process wherein optionally a minor portion of the monomers are initially charged in the reactor and the remainder of the monomers then added gradually over the course of the reaction. The entire amount of the free radical initiator can be present in the polymerization reactor before introduction of the monomers, or alternatively a portion of it can be added continuously or incrementally during the course of the polymerization.

In the second step, the mixture prepared in Step (I) is heated at a sufficient temperature to cause the ethylenically unsaturated monomer and anhydride monomer to polymerize. Preferably the mixture is heated at a temperature of from about 30° C. to about 150° C., more preferably from about 50° C. to about 100° C., for a sufficient period of time to form a copolymer having repeat units derived from the ethylenically unsaturated monomer and anhydride monomer. It is noted that Step (II) is preferably conducted below the boiling point of the ethylenically unsaturated monomer which is generally less than 150° C. During the formation of the copolymer having monomer repeat units, the polyglycol acts as a solvent medium. In addition to the formation of the copolymer which is a reaction product of the ethylenically unsaturated and anhydride monomers, a copolymer grafted polyglycol comprising a main polyglycol backbone having copolymer side chains may be formed. The copolymer grafted polyglycol is formed from the reaction of the hydroxyl or amine functional group on the polyglycol with the anhydride. Depending on the polyglycol functional group, either a half amide or half ester is formed with the anhydride.

The time of the reaction in Step (II) is preferably from about 30 minutes to about 5 hours, more preferably from about 1 hour to about 3 hours. The copolymer and copolymer grafted polyglycol are dispersed in unreacted polyglycol. The unreacted polyglycol is present in the polymerization reactor either from the mixture added in Step (I) or additional polyglycol may be added to the polymerization reactor in Step(II). The reaction time for Step (II) is preferably from about 30 minutes to about 5 hours, more preferably from about 1 hour to about 3 hours.

In the third step, the copolymer having repeat units derived from the $\alpha,\beta$-ethylenically unsaturated monomer and anhydride monomer, and the copolymer grafted polyglycol are heated in the presence of any unreacted polyglycol or fresh polyglycol at a temperature of from about 50° C. to about 300° C. for a sufficient period of time to form an anhydride based graft copolymer. Preferably the temperature is from about 100° C. to about 200° C., most preferably from about 120° C. to about 180° C. The time of the reaction is preferably from about 1 hour to about 10 hours, more preferably from about 2 hours to about 8 hours, and most preferably from about 4 hours to about 6 hours.

While not wishing to be bound by any theory, the inventors believe that the anhydride based graft copolymer which is formed in Step (III) may be present in at least one of the following three forms. The anhydride based graft copolymer may be present as a polyglycol grafted copolymer comprising a main copolymer backbone chain having polyglycol side chains. The anhydride based graft copolymer may also be present as a copolymer grafted polyglycol comprising a main polyglycol backbone having copolymer side chains. Additionally, the anhydride based graft copolymer may be present as a polyglycol and copolymer grafted copolymer comprising a main copolymer backbone chain having polyglycol side chains and copolymer side chains attached to the polyglycol side chains. The anhydride based graft copolymer prepared by the method of the invention may exist in any one or two of the three anhydride based graft copolymer forms or in any combination of the three anhydride based graft copolymer forms.

The anhydride based graft copolymer may be used in any cleaning composition which is used to remove soil from an article. As used herein, "clean" means to remove soil from an article, inhibit soil deposition in a cleaning or washing process, or provide soil resistance to an article or combinations thereof. Articles which may be cleaned using the copolymers of the present invention are articles which come into contact with soil and which are capable of being cleaned in a cleaning process. Examples of articles which may be cleaned using the anhydride based graft copolymer include fabrics, such as clothing, linens, carpets, or upholstery; hard surfaces such as countertops, windows, floors, dishes, glasses or tiles; or automobiles.

The cleaning composition may be a solid or liquid composition. If the cleaning composition is solid, the cleaning composition may be in any of the usual physical forms, such as for example, powders, beads, flakes, bars, tablets, noodles, pastes, and slurries. If the cleaning composition is liquid, the cleaning composition preferably disperses or solubilizes the anhydride based graft copolymer so that it is easily contacted with the article. The cleaning composition may be aqueous or nonaqueous. For example, the anhydride based graft copolymer may be dissolved or dispersed in water, in one or more solvents or inert diluents. Preferably the cleaning composition is aqueous. The cleaning composition preferably contains the anhydride based graft copolymer in an amount of from about 1 to about 60 weight percent, more preferably from about 2 to about 20 weight percent, based on the total weight of the cleaning composition.

The cleaning compositions prepared using the anhydride based graft copolymers may contain any additional components which are used in cleaning compositions. Such additional components are well known to those skilled in the art and include one or more surfactants, builders, ion exchangers, alkalies, anticorrosion materials, antiredeposition materials, optical brighteners, fragrances, dyes, chelating agents, enzymes, whiteners, brighteners, antistatic agents, sudsing control agents, solvents, hydrotropes, bleaching agents, perfumes, bleach precursors, water, buffering agents, soil removal agents, soil release agents, softening agent, opacifiers, inert diluents, buffering agents, corrosion inhibitors, graying inhibitors, anti-redeposition agents, stabilizers, opacifiers, fillers, builders, phosphate co-builder, and phosphate-replacer builder. Combinations of such additional components may also be used.

Preferably cleaning compositions prepared using the anhydride based graft copolymers contain at least one surfactant. Suitable surfactants include nonionic, anionic, cationic, and amphoteric surfactants. The surfactants which may be used in the cleaning compositions according to the invention may also be soaps.

Anionic surfactants include, for example, from $C_8$ to $C_{12}$ alkylbenzenesulfonates, from $C_{12}$ to $C_{16}$ alkanesulfonates, from $C_{12}$ to $C_{16}$ alkylsulfates, from $C_{12}$ to $C_{16}$ alkylsulfosuccinates and from $C_{12}$ to $C_{16}$ sulfated ethoxylated alkanols.

Nonionic surfactants include, for example, from $C_6$ to $C_{12}$ alkylphenol ethoxylates, from $C_{12}$ to $C_{20}$ alkanol alkoxylates, and block copolymers of ethylene oxide and propylene oxide. Optionally, the end groups of polyalkylene oxides can be blocked, whereby the free OH groups of the polyalkylene oxides can be etherified, esterified, acetalized and/or aminated. Another modification consists of reacting the free OH groups of the polyalkylene oxides with isocyanates. The nonionic surfactants also include $C_4$ to $C_{18}$ alkyl glucosides as well as the alkoxylated products obtainable therefrom by alkoxylation, particularly those obtainable by reaction of alkyl glucosides with ethylene oxide.

Cationic surfactants contain hydrophilic functional groups where the charge of the functional groups are positive when dissolved or dispersed in an aqueous solution. Typical cationic surfactants include, for example, amine compounds, oxygen containing amines, and quaternary amine salts.

Amphoteric surfactants contain both acidic and basic hydrophilic groups. Amphoteric surfactants are preferably derivatives of secondary and tertiary amines, derivatives of quaternary ammonium, quaternary phosphonium or tertiary sulfonium compounds. The cationic atom in the quaternary compound can be part of a heterocyclic ring. The amphoteric surfactant preferably contains at least one aliphatic group, containing about 3 to about 18 carbon atoms. At least one aliphatic group preferably contains an anionic water-solubilizing group such as a carboxy, sulfonate, or phosphono.

Generally, anionic surfactants, such as linear alkyl sulfonates (LAS) are preferred for use in solid cleaning compositions containing the anhydride based graft copolymers. Nonionic and anionic surfactant mixtures such as alcohol ethoxylates and LAS are preferred in liquid cleaning compositions containing the anhydride based graft copolymers. The surfactants are optionally present in an amount of from about 0 to about 50 weight percent, preferably from about 2 to about 45 weight percent, and more preferably from about 5 to about 40 weight percent based on the total weight of the cleaning composition.

Examples of builders which may be present in the cleaning composition include, for example, phosphates, such as pyrophosphates, polyphosphates, or sodium tripolyphosphate. Further examples are zeolites, sodium carbonate, poly(carboxylic acids), nitrotriacetic acid, citric acid, tartaric acid, the salts of the aforesaid acids and the monomeric, oligomeric, or polymeric phosphonates. Combinations of builders may also be used. The builders are optionally present in an amount of from 0 to about 85 weight percent, preferably from about 5 to about 50 weight percent based on the total weight of the cleaning composition.

Liquid cleaning compositions containing the anhydride based graft copolymers can contain up to 80 weight percent water or solvents or combinations thereof. Typical solvents which may be used include oxygen containing solvents such as alcohols, esters, glycol, and glycol ethers. Alcohols that may be used in the cleaning compositions include, for example, methanol, ethanol, isopropanol, and tertiary butanol. Esters which may be used include, for example, amyl acetate, butyl acetate, ethyl acetate, and esters of glycols. Glycols and glycol ethers that are useful as solvents include, for example, ethylene glycol, propylene glycol, and oligomers of ethylene or propylene glycol.

Solid cleaning compositions containing the anhydride based graft copolymers preferably contain up to 60 weight percent of one or more solid inert diluents such as sodium sulfate, sodium chloride, or sodium borate.

The cleaning composition may contain 0 to about 50 weight percent of one or more buffering agents. Buffering agents include, for example, one or more alkali metal salts such as silicates, carbonates, or sulfates. Buffering agents also include, for example, organic alkalis such as triethanolamine, monoethanolamine, and triisopropanolamine.

Fabric softening agents typically include quaternary ammonium salts such as ditallowdimethyl-ammonium chloride.

Other additives which optionally may be included in the cleaning compositions especially for detergent compositions are bleaching agents, used in an amount of up to about 30 weight percent, corrosion inhibitors such as silicates used in an amount of up to about 25 weight percent, dye deposition inhibiting agents used in an amount up to about 20 weight percent, and graying inhibitors used in an amount of up to about 5 weight percent.

Suitable bleaching agents are, for example, perborates, percarbonates, or chlorine-generating substances such as chloroisocyanurates. Suitable silicates used as corrosion inhibitors are, for example, sodium silicate, sodium disilicate, and sodium metasilicate. Suitable dye deposition inhibiting agents are, for example, polyvinyl pyrrolidone. Examples of graying inhibitors are, for example, carboxymethylcellulose, methylcellulose, hydroxypropylmethylcellulose, and graft copolymers of vinyl acetate and polyalkylene oxides having a molecular weight of 1,000 to 15,000.

The cleaning composition containing the anhydride based graft copolymer is contacted with one or more articles, where at least one article contains soil. Contacting can be carried out, for example, by immersing the articles in the cleaning composition and agitating the articles in the cleaning composition containing the polymer. Contacting can also be accomplished by wiping, spraying, or padding the cleaning composition on the articles.

In a preferred embodiment of the invention, the anhydride based graft copolymer is incorporated in a detergent formulation. In a detergent formulation, the anhydride based graft copolymers are preferably present in an amount of from about 0.1 to about 25 weight percent, more preferably from about 0.5 to about 10 weight percent, and most preferably from about 1 to about 5 weight percent, based on the total weight of the detergent formulation. When the detergent formulation is a laundry detergent, the anhydride based graft copolymers function to reduce the amount of oily soil that can adhere to the cloth. Subsequent washing of the cloth will remove more soil as a result of the reduced interactions between the soil and the cloth.

In another preferred embodiment of the invention, the anhydride based graft copolymers are incorporated into a prespotter formulation for direct application to a soiled fabric or carpet. The copolymers aid in removal of soil from fabric even if the fabric is subsequently washed in a laundry detergent which does not contain the copolymers. When used in a prespotter formulation, the anhydride based graft copolymers are preferably present in an amount of from about 0.5 to about 75 weight percent, more preferably from about 1 to about 15 weight percent, and most preferably from about 2 to about 10 weight percent, based on the total weight of the prespotter formulation.

In another preferred embodiment of the invention, the anhydride based graft copolymers may be used in fabric sizing and textile finishing. Textiles and yarn can be washed in a solution of the copolymers. This washing results in exhaustion of the anyhdride based graft copolymers onto the yarn or textile. The yarn is then woven onto fabric. Because of the cleaning properties of the copolymers, desizing removes oils, wax and dirt more effectively than would occur with standard desizing procedures.

The following nonlimiting examples illustrate further aspects of the invention.

EXAMPLE 1

Preparation of Styrene-Maleic Anhydride Graft Copolymer Using Solvent.

Styrene-maleic anhydride resin (SMA 1000 from Elf Atochem), 15 grams, was slurried in an amine terminated poly(oxypropylene-b-oxyethylene) copolymer (JEFFAMINE XTJ 505 from Huntsman). The reaction mixture was heated to 90° C. and the temperature was maintained for a period of 6 hours. The reaction product was a viscous yellow oil which was cooled. The product was dissolved in 100 grams of 2-propanol which formed an amber colored liquid.

EXAMPLE 2
Preparation of Styrene-Maleic Anhydride Graft Copolymer Using Solvent.

Styrene-maleic anhydride resin (SMA 1000 from Elf Atochem), 20 grams, was slurried in 39.6 grams of ethoxy polyethylene glycol (CARBOWAX 550 from Union Carbide), 13.5 grams of NEODOL 25-9 and 26.1 grams of NEODOL 25-7 from Shell Chemical. The reaction mixture was heated to 110° C. for 2 hours and the temperature was raised to 140° C. for 3 hours. The reaction product was a clear yellow oil solution which was cooled. Water, 226.1 grams was added. The pH of the solution was then adjusted to between 6 and 7 using about 2 mls of 50% NaOH solution. The final solids of the reaction product was approximately 30 percent.

EXAMPLE 3
Preparation of Styrene-Maleic Anhydride Graft Copolymer Using Solvent.

Styrene-maleic anhydride resin (SMA 1000 from Elf Atochem), 20 grams, was slurried in 29.7 grams of ethoxy polyethylene glycol (CARBOWAX 550 from Union Carbide), 10.1 grams of NEODOL 25-9 and 19.8 grams of NEODOL 25-7 from Shell Chemical. The reaction mixture was heated to 160° C. and held at that temperature for a period of 6 hours. The reaction product was a clear yellow oil solution which was cooled and diluted with 185.7 grams of water. The pH of the solution was adjusted to between 6 and 7 using about 2 mls of 50% NaOH solution. The final solids of the reaction product was determined to be approximately 30 percent.

EXAMPLE 4
Preparation of Styrene-Maleic Anhydride Graft Copolymer Using Solvent.

Styrene-maleic anhydride resin (SMA 1000 from Elf Atochem), 20 grams was slurried in 19.7 grams of ethoxy polyethylene glycol (CARBOWAX 550 from Union Carbide), 13.5 grams of NEODOL 25-9 and 26.4 grams of NEODOL 25-7 from Shell Chemical. The reaction mixture was heated to 160° C. and held at that temperature for a period of 6 hours. The reaction product was a clear yellow oil solution which was cooled and diluted with 185.7 grams of water. The pH of the solution was then adjusted to between 6 and 7 using about 2 mls of 50% NaOH solution. The final solids of the reaction product was determined to be approximately 30 percent.

EXAMPLE 5
Evaluation of Soil Release Properties of Copolymers Prepared in Examples 1–4.

The styrene-maleic anhydride graft copolymers prepared in Examples 1–4 were evaluated in a soil release test and compared to a commercial soil release polymer (SRP4 from Rhone-Poulenc) which is commonly used to remove soil from polyesters. In this test, 3 swatches were prewashed in a TERG-O-TOMETER at a temperature of 93° F., 110 ppm water hardness and 80 rpm agitation using 0.5 g/L of AATCC detergent and 9 ppm of one of the polymers prepared in Examples 1–4 or SRP4. Each of the swatches was dried and stained with spaghetti sauce. The swatches were washed in a TERG-O-TOMETER at a temperature of 93° F., 110 ppm water hardness and 80 rpm agitation using 0.5 g/L of AATCC detergent and 9 ppm of one of the polymers prepared in Examples 1–4 and SRP4. The soil release properties for each of the swatches is summarized in Table I.

TABLE I

| Polymer | % Soil Release on Polyester | % Soil Release on Cotton |
| --- | --- | --- |
| None | 53.8 | 51.8 |
| SRP4 | 72.0 | — |
| EX. 1 | 73.3 | 51.5 |
| EX. 2 | 74.0 | 65.1 |
| EX. 3 | 74.3 | 65.5 |
| EX. 4 | 68.6 | 64.9 |

The test results in Table 1 clearly show that the styrene-maleic anhdyride graft copolymers prepared in Examples 1–4 exhibit excellent soil release on cotton and polyester as compared to untreated cotton and polyester. In addition, the styrene-maleic anhdyride graft copolymers prepared in Examples 14 exhibit excellent soil release on cotton and polyester while the commercially available SRP4 polymer only exhibits soil release on polyester.

EXAMPLE 6
Evaluation of styrene-maleic anhydride graft copolymer as a soil guard.

The polymer prepared in Example 1 was evaluated in a soil guard test using the TERG-O-TOMETER. All the swatches were cleaned by washing to remove the original textile finish. The prewash in a TERG-O-TOMETER at a temperature of 93° F., 110 ppm water hardness and 80 rpm agitation using 0.5 g/L of AATCC detergent and 9 ppm of one of the polymers conducted in a terg using 0.5 g/L of AATCC detergent, 18 weight percent polymer based on weight of detergent, 110 ppm hardness water, 93° F. and 80 rpm. A 20 minute wash and a 3 minute rinse was used. The swatches ere dried and stained with spaghetti sauce (Ragu traditional). The stains were allowed to set for overnight. The swatches were then washed with detergent but without the polymer under the same conditions as used for the prewash.

The soil guard properties for the styrene-maleic anhydride graft copolymer prepared in Example 1 were evaluated using spaghetti sauce (RAGU Traditional) under TERG-O-TOMETER conditions. There were three swatches in each pot. The swatches had one prewash with polymer. The swatches were dried then stained and finally washed without any copolymer. A 20 minute wash and a 3 minute rinse was used. The test was conducted in a TERG-O-TOMETER using a 0.5 g/L of AATCC detergent, 18 weight percent copolymer based on the weight of the detergent, 110 ppm hardness water, 93° F. and 80 rpm. No copolymer was added in the final wash.

A color picture of the swatches was taken using the scanning machine. The pictures indicate that the swatches prewashed with the styrene-maleic anhydride graft copolymer prepared in Example 1 exhibited better stain removal than the control (no polymer) even though both tests had no polymer in the final wash. Thus, the styrene-maleic anhydride copolymer exhibits soil guard properties.

EXAMPLE 7
Solventless Method for Preparing Styrene-Maleic Anhydride Graft Copolymer.

Styrene, 30.9 grams, and 29.1 grams of maleic anhydride was stirred with 216.0 grams of CARBOWAX methoxy polyethylene glycol 550 (from Union Carbide), 8,2 grams of NEODOL 25-9 and 15.8 grams of NEODOL 25-7 (both obtained from Shell Chemical) which formed a homogeneous clear/colorless mixture. The mixture was heated to 50° C. and 1.2 grams of lauroyl peroxide and 1.2 grams of dicumyl peroxide were added while a nitrogen blanket was introduced. The reaction temperature was increased to 116.5° C. over a 2 hour period of time. It was observed that at 74° C. the mixture became pale yellow, hazy/milky in appearance. It was observed that at 92° C. the mixture became peach colored, hazy/milky in appearance. The reaction temperature was increased to 152° C. over a 1 hour period of time and held at that temperature for 30 minutes wherein the mixture appeared rose colored and clear. The reaction product was cooled.

The reaction product was diluted to 30% "activity" with tap water to form a solution. As used herein, "activity" is the neat polymeric product obtained from the in situ polymerization/esterification. The pH of the solution was adjusted from 2.7 to 6.3 using 10.8 grams of a 50% solution of NaOH.

The solution was pink and clear which changed to a golden yellow color after two days.

EXAMPLE 8
Solventless Method for Preparing Styrene-Maleic Anhydride Graft Copolymer.

Styrene, 30.9 grams, and 29.1 grams of maleic anhydride was stirred with 168.0 grams of CARBOWAX methoxy polyethylene glycol 550 (from Union Carbide), 24.6 grams of NEQDOL 25-9 and 47.4 grams of NEODOL 25-7 (both obtained from Shell Chemical) which formed a homogeneous clear/colorless mixture. The mixture was heated to 50° C. and 1.2 grams of lauroyl peroxide and 1.2 grams of dicumyl peroxide were added while a nitrogen blanket was introduced. The reaction temperature was increased to 125° C. over a 2 hour period of time. It was observed that at 63° C. the mixture became pale yellow, hazy in appearance, at 93° C. the mixture became orange/yellow in appearance, at 105° C. the mixture became yellow, almost clear, at 110° C. the mixture became orange and clear. The reaction temperature was increased to 148° C. over a 1 hour period of time and held at that temperature for 45 minutes. It was observed that at 146° C. the mixture became rose color and clear. The reaction product was cooled.

The reaction product was diluted to 30% "activity" with tap water to form a solution. As used herein, "activity" is the neat polymeric product obtained from the in situ polymerization/esterification. The pH of the solution was adjusted from 2.7 to 6.5 using 11.1 grams of a 50% solution of NaOH.

The solution was pink and clear which changed to a golden yellow color after two days.

EXAMPLE 9
Solventless Method for Preparing Styrene-Maleic Anhydride Graft Copolymer.

Styrene, 30.9 grams, and 29.1 grams of maleic anhydride was stirred with 120 grams of CARBOWAX methoxy polyethylene glycol 550 (from Union Carbide), 41 grams of NEODOL 25-9 and 79 grams of NEODOL 25-7 (both obtained from Shell Chemical) which formed a homogeneous clear/colorless mixture. The mixture was heated to 50° C. and 0.3 grams of lauroyl peroxide and 0.3 grams of dicumyl peroxide were added while a nitrogen blanket was introduced. The reaction temperature was increased to 110° C. over a 2 hour period of time. It was observed that at 63° C. the mixture became pale yellow and clear, in appearance, at 68.5° C. the mixture became pale yellow and hazy in appearance, at 95° C. the mixture became yellow, almost clear, at 103° C. the mixture became yellow and clear. The reaction temperature was increased to 152° C. over a 1 hour period of time and held at that temperature for 130 minutes. It was observed that at 142° C. the mixture became light pink and clear. The reaction product was cooled.

The reaction product was diluted to 30% "activity" with tap water to form a solution. As used herein, "activity" is the neat polymeric product obtained from the in situ polymerization/esterification. The pH of the solution was adjusted from 2.7 to 6.8 using 11 grams of a 50% solution of NaOH. The solution was pink and clear which changed to a golden yellow color after 2 days.

EXAMPLE 10
Evaluation of anhydride based graft copolymers in Prespotter Test.

In a prespotter test, 2 grams of each of the polymers prepared in Examples 2–4 and 7–9 were spotted on a stained swatch and allowed to sit overnight. The stained swatch was dust/sebum on cotton (available from Test Fabrics). The swatch was washed in a TERG-O-TOMETER using 0.9 g/l AATCC detergent at 93° F., 80 rpm and 110 ppm water hardness using a 10 minute wash and 5 minute rinse. The L, a, and b values were measured before and after the wash.

The ΔE was calculated from the following equation:

$$\Delta E = [(L_1-L_2)^2 + (a_1-a_2)^2 + (b_1-b_2)^2]^{0.5}$$

The test results are summarized in Table II.

TABLE II

Results of the prespotter test for anhydride based graft copolymers on Dust-Sebum stains.

| Polymer | ΔE for prespotter test with detergent for in-situ solventless samples | ΔE for prespotter test without detergent for in-situ solventless samples | ΔE for prespotter test without detergent for samples using solvent |
| --- | --- | --- | --- |
| None | 7.8 | 4.5 | 4.5 |
| Ex. 7 | 17.2 | 13.6 | 13.0 (Ex. 2) |
| Ex. 8 | 16.3 | 15.6 | 14.9 (Ex. 3) |
| Ex. 9 | 18.6 | 16.7 | 15.7 (Ex. 4) |

The results in Table II show that the anhydride based graft copolymers prepared by the method of the invention performed significantly better as prespotters for removing stains from cloth than the control which did not use a polymer. The anhydride based graft copolymers prepared using the in situ solventless method of the invention outperformed the styrene-maleic anhydride graft copolymers which were prepared using a solvent and in a conventional process requiring isolation of the polymer. Unexpectedly, the anhydride based copolymers prepared by the method of the invention do not require a surfactant and function as prespotters displaying excellent soil release properties even when washed in the absence of any other detergent.

EXAMPLE 11
Evaluation of Polymers in Commercial Liquid Detergent

The styrene-maleic anhydride copolymers prepared in Examples 1–4 were added to Amway SA8 liquid detergent. A 1% active polymer solution was added to the liquid detergent and the compatibility was observed over a period of days. The test results are summarized in Table III.

TABLE III

| Polymer | Compatibility in the Amway SA8 formulation |
| --- | --- |
| Example 1 | Stable for 2 weeks at room temperature |
| Example 2 | Stable for 2 weeks at room temperature |
| Example 3 | Stable for 2 weeks at room temperature |
| Example 4 | Stable for 2 weeks at room temperature |

The results in Table III clearly show that that the styrene-maleic anhydride graft copolymers prepared by the method of the invention were very compatible in the Amway SA8 liquid detergent. The samples with the styrene-maleic anhydride copolymers were translucent as was the control which did not contain any polymer.

While the invention has been described with particular reference to certain embodiments thereof, it will be understood that changes and modifications may be made by those of ordinary skill in the art within the scope and spirit of the following claims.

What is claimed is:

1. A cleaning composition comprising an anhydride based graft copolymer, said anhydride based graft copolymer is prepared by an in situ solvent free method comprising (I) mixing from about 50 to about 90 mole percent, based on the total moles of monomer, of an ethylenically unsaturated monomer, from about 10 to about 50 mole percent, based on the total moles of monomer, of an anhydride monomer selected from the group consisting of maleic anhydride, itaconic anhydride, and mixtures thereof, either a monofunctional polyglycol having a hydroxyl or amine terminal group or a polyfunctional polyglycol having a weight average molecular weight of greater than 5,000 and at least one terminal hydroxyl group, and a free radical initiator to form a mixture;

(II) heating the mixture at a temperature of from about 30° C. to about 100° C. for a sufficient period of time to form a copolymer having repeat units derived from the ethylenically unsaturated monomer and anhydride monomer, and a copolymer grafted polyglycol comprising a main polyglycol backbone having copolymer side chains, wherein the copolymer and copolymer grafted polyglycol are dispersed in unreacted polyglycol; and (III) heating the copolymer, copolymer grafted polyglycol and unreacted polyglycol at a temperature of from about 50° C. to about 300° C. for a sufficient period of time to form an anhydride based graft copolymer, wherein the anhydride based graft copolymer is selected from the group consisting of a polyglycol grafted copolymer comprising a main copolymer backbone chain having polyglycol side chains, a copolymer grafted polyglycol comprising a main polyglycol backbone having copolymer side chains, a polyglycol and copolymer grafted copolymer comprising a main copolymer backbone chain having polyglycol side chains and copolymer side chains attached to the polyglycol side chains, and mixtures thereof.

2. The cleaning composition according to claim 1 further comprising at least one additive selected from the group consisting of water, builders, surfactants, ion exchangers, alkalies, anticorrosion materials, antiredeposition materials, antistatic agents, optical brighteners, perfumes, fragrances, dyes, fillers, chelating agents, enzymes, fabric whiteners, brighteners, sudsing control agents, solvents, hydrotropes, bleaching agents, bleach precursors, buffering agents, soil removal agents, soil release agents, fabric softening agent, and opacifiers.

3. In a aqueous prespotter composition, the improvement comprising adding 1 to 99 weight percent, based on the total weight of the prespotter composition, of an anhydride based graft copolymer which comprises the reaction product of an ethylenically unsaturated monomer, an anhydride monomer selected from the group consisting of maleic anhydride, itaconic anhydride, and mixtures thereof, either a monofunctional polyglycol having a hydroxyl or amine terminal group or a polyfunctional polyglycol having a weight average molecular weight of greater than 5,000 and at least one terminal hydroxyl group, and a free radical initiator to form an anhydride based graft copolymer.

* * * * *